Sept. 23, 1958 C. F. STANLEY 2,853,338
COLLAPSIBLE AUTO TRAILER
Filed July 6, 1956 3 Sheets-Sheet 2

INVENTOR:
CHARLES F. STANLEY
BY:
Green, McCallister & Miller
HIS ATTORNEYS.

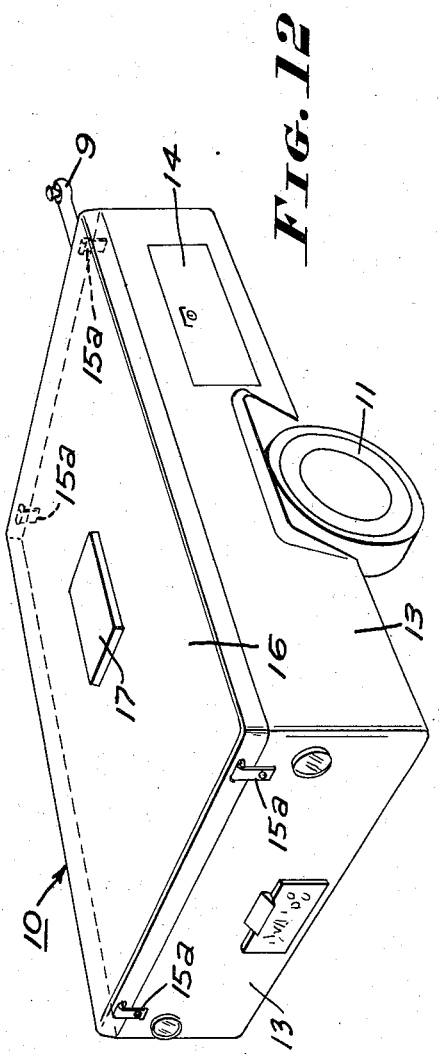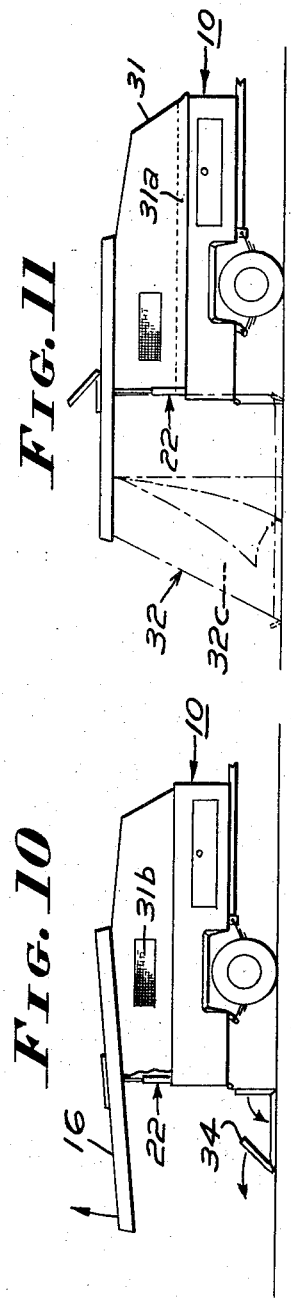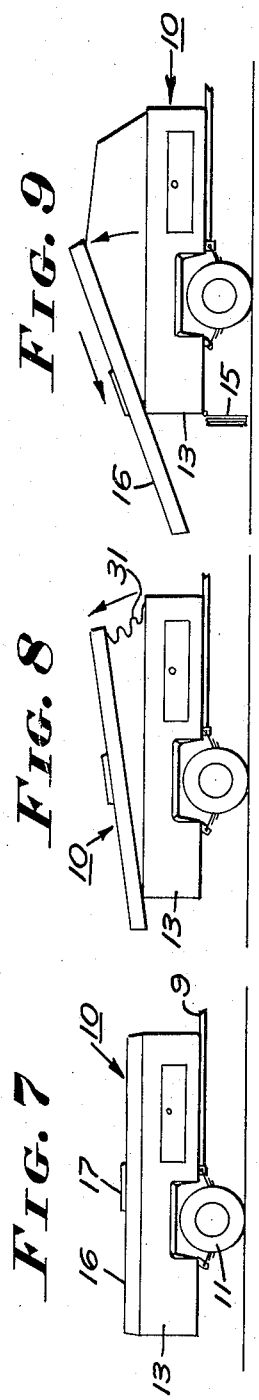

United States Patent Office 2,853,338
Patented Sept. 23, 1958

2,853,338

COLLAPSIBLE AUTO TRAILER

Charles F. Stanley, Pittsburgh, Pa.

Application July 6, 1956, Serial No. 596,313

8 Claims. (Cl. 296—23)

This invention relates to a wheeled trailer and particularly, to a collapsible trailer that may be used for camping trips and outings.

I have found that there is a need for an automobile trailer which will compactly and efficiently carry necessary camping or sleeping equipment, but will be practical for employment with a single support frame and axle assembly, and which essentially will present a relatively low silhouette when in a compacted or closed relationship.

Trailer constructions investigated by me have had the tendency to be improperly balanced, top-heavy or deficient in some respect, such as in obscuring the vision of the driver of the car. I consider a clear vision a highly important factor.

It has thus been an object of my invention to provide an improved collapsible wheeled type of trailer which will meet objectional features of prior constructions and provide an improved arrangement of operating and carrying parts;

Another object of my invention has been to provide a trailer which may be easily set up and collapsed by one person, which is fool-proof in its installation and use, and which compactly carries essential and operating parts;

A further object has been to devise a trailer which presents a relatively low center of gravity and silhouette when in a compacted relationship for hitch-hauling;

A still further object has been to provide a new and improved type of roof and hood or canopy construction for a trailer;

These and other objects of my invention will appear to those skilled in the art from the embodiment illustrated in the drawings and hereinafter described.

In the drawings,

Figure 3 is a greatly enlarged vertical section in elevation taken along the right-hand rear corner of the construction of Figure 1 and illustrating a vertically collapsible, telescopic post or support column assembly for the roof;

Figure 4 is a vertical side sectional detail on a slightly enlarged scale as to Figure 3 and taken along the line IV—IV of the same figure;

Figure 5 is a horizontal sectional detail on an enlarged scale with respect to Figure 4 and taken along the line V—V of Figure 1;

Figure 6 is a further enlarged horizontal sectional detail taken along the line VI—VI of Figure 3;

Figure 1:
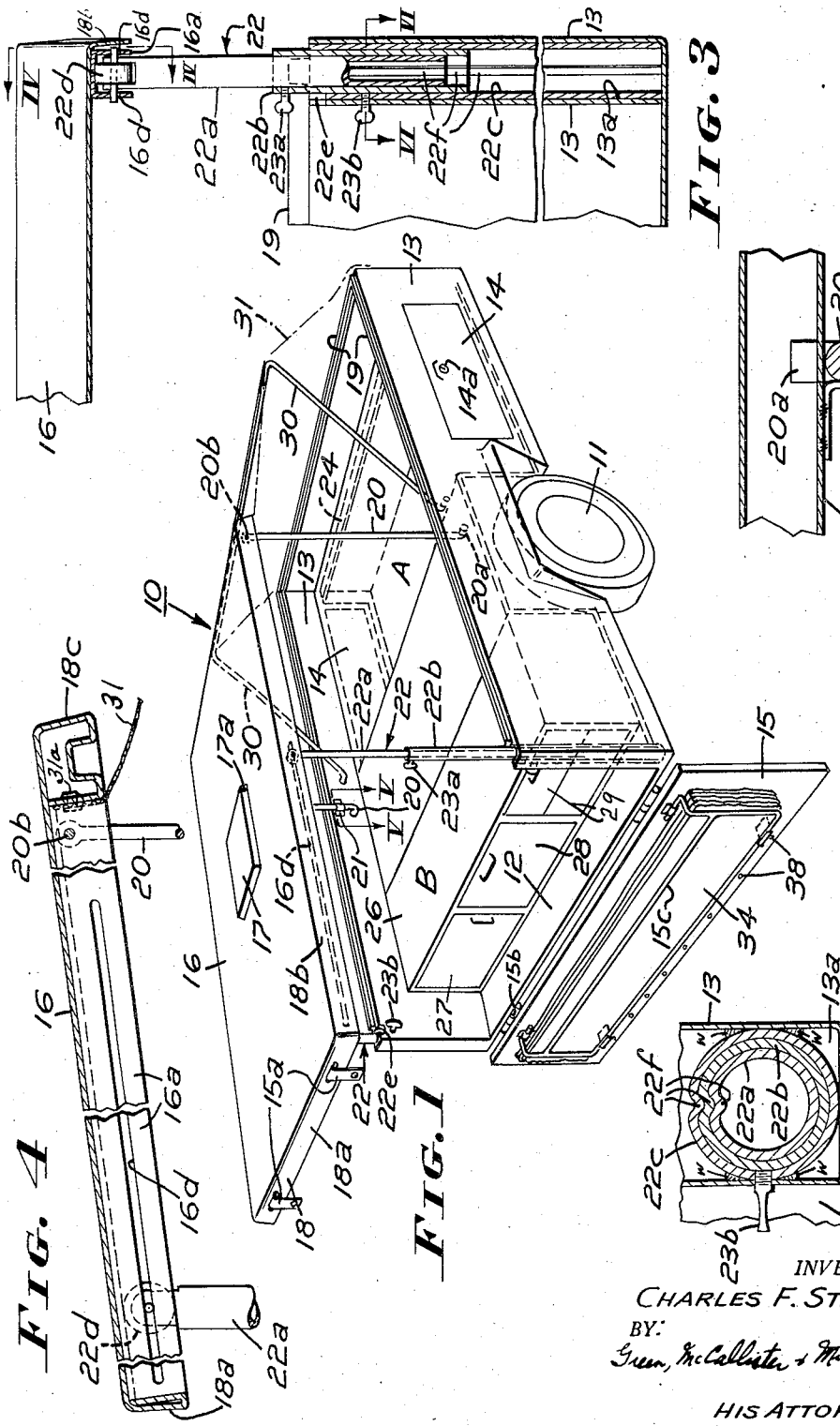
Figure 1 is a side and end perspective view in elevation of a trailer constructed in accordance with my invention.
Figure 2:
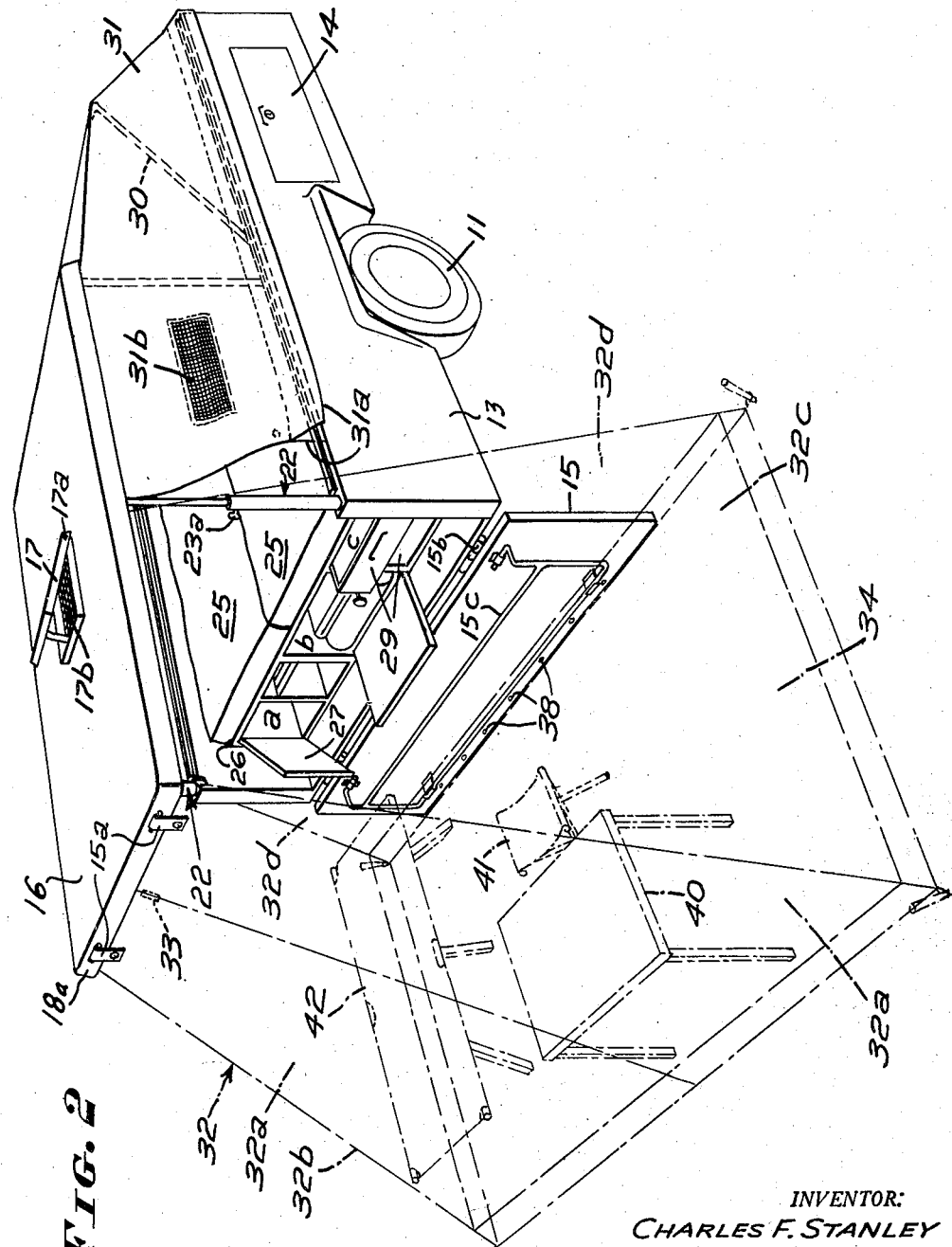
Figure 2 is also a perspective end and side view in elevation on the same scale as Figure 1; it illustrates the trailer construction in a fully assembled relationship with a tent extension in position.

Figures 7 to 11, inclusive, are reduced side views in elevation illustrating step-by-step procedure in assembling a trailer construction of my invention and thus, in a reverse manner, illustrating procedure involved in taking it down and collapsing its members; and Figure 12 is an end and side perspective view in elevation on the scale of Figures 1 and 2; it shows the trailer construction in its collapsed, closed, and ready-to-travel relationship.

Referring particularly to Figures 1, 2 and 12, I have provided a trailer unit 10 of rather compact construction which has a relatively low mounting with respect to the roadway and with respect to a wheel, spring and axle structure 11. The unit 10 requires a relatively low head space when it is in a collapsed or closed relationship. Its structure 11 may, as shown, employ only one set or pair of wheels. As shown, the unit 10 may be hitched or connected to an automobile or truck motive unit by a conventional front hitch or coupling 9. The trailer unit 10, as shown in Figure 1, has an under-bed, floor or bed plate 12 on which it is carried. A pair of opposed, vertically-upright, side walls and a forward end wall, all designated as 13, are integral with the bed plate member 12 and project upwardly therefrom to define a three-walled trailer space, box or bed that is open at its back end. The trailer box thus provided may be made of sheet or plate aluminum or steel and is preferably of double-wall construction to reinforce it and take support posts, etc.

As shown particularly in Figure 1, the space above the trailer box is divided into two, substantially equal length, front and back compartments A and B. Access is had to the compartment A, see also Figure 12, by means of side, swing-out, hinged doors 14 having conventional tumbler locks 14a. The compartment B is alternately opened and closed at its rear end (see Figures 1 and 2) by means of a swing door 15. The door 15 is hinged at 15b to swing downwardly from and with respect to the back end of the floor or bed plate member 12.

As shown in Figure 12 the door 15 as well as a roof, top or cover part or platform-like, substantially rigid, non-collapsible, rectangular top framing member 16, are secured in a closed relationship with each other by hasp and tumbler lock units 15a that are hinged to project downwardly from opposite ends of the top member 16. At the front end of the top member 16, the hasp assemblies 15a are locked to the front end wall portion of the three-wall assembly 13. It may be noted that the first step in assembling the trailer unit 10 from its collapsed and carrying positions of Figures 7 and 12, is to unlock the hasp assemblies 15a.

The tail gate or back swing door 15, as shown in Figures 1 and 2, has a wire rack or frame 15c secured to its inside portion to receive and carry a folded section of tent 32, such as floor section 34.

The roof 16 has been shown provided with a ventilator 17 in its central area that is hinged at 17a and that carries a suitable screen or grill 17b. A downwardly-projecting, bounding rim 18 (see Figure 1) extends about the outer edges or periphery of the top member 16 and is divided into a back portion 18a, a pair of opposed side portions 18b, and a front portion 18c (see also Figure 4). The integral rim construction 18 provides a finish rim for sealing or closing-off the trailer unit (see Figure 12). In this connection, it cooperates with a mid alignment strip or upright rim portion 19 that projects along a top edge of the side and end wall construction 13. The rim 18 is adapted to project downwardly and rest flush with the edge of the construction 13, on the outside of and along the alignment strip 19.

A collapsible back canopy, hood or foldable closure 31 (for example, of canvas or duck) is secured as by snaps at its front end to the front end of the wall structure 13 to project upwardly therefrom. As shown in Figure 4, the hood 31 is secured at its other or upper end underneath the roof 16 by rivets 31a to a U-shaped back extension of the front rim portion 18c. A U- shaped swing and front support wire or frame member 30 is, at its back ends, provided with turned-in pivot elbow portions that are pivoted between and within transverse slots in side walls 13. The frame member 30 swings with the hood or canopy 31 and supports it in an expanded or extended relationship, such as shown in Figure 1.

The roof 16 is, at its front end, carried by a pair of swing type vertical support rod columns or members 20. In mentioning front and back end in the description, I have reference to the hitching or coupling end of a trailer as representing its front end and the end which carries its tail gate or downswing door 15 as the back end thereof. The lower ends of these members have turned-in pivot elbow portions 20a that, like those of the member 30, extend into transverse pivot slots from the inside of the side walls 13. The upper end of each support rod 20 is secured by a pivot pin 20b (see Figures 1 and 4) to the under-side of front end portions of side rim portions 18b. Snap-hold, stop-limit brackets 21 (see Figures 1 and 5) are secured, as by welding, to project inwardly from the side walls 13, and to provide spring-like snap-in sockets to receive and hold the support rods 20 in their upper or substantially vertical positions shown in Figure 1. These brackets 21, of course, may be flexed outwardly to permit the rod members 20 to swing downwardly within the inside of the walls 13.

To securely support the roof 16 in its backwardly-projecting, expanded or assembled relationship of Figure 1 and substantially centrally of the length of its sides, I have provided a pair of vertical-upright, support column or member assemblies 22 which, as shown in Figures 3 and 6, may be of hollow or tubular construction. Each innermost, smallest diameter, upper support column part 22a is bifurcated or slotted-out (see Figure 3) to rotatably receive a guide roller and shaft assembly 22d (see also Figure 4). The pin of each assembly 22d projects from opposite ends of its roller wheel to ride in and along opposed guide slots 16d that are provided in opposed flange portions of a channel-shaped, under-mounted, track member 16a. The member 16a is secured along its base web or upper portion to project downwardly from the underside of the roof member 16 and on opposite sides along side rim portions 18b.

The inner column part 22a is adapted to slide or collapse within an intermediate column part 22b of the collapsible assembly of column parts or members 22, see particularly Figure 3. The assembly 22 includes the inner hollow column 22a, the intermediate hollow column 22b, and an outer hollow column 22c. The column 22c, being of greater diameter, serves as the support member or part for the assembly 22; and in this connection, the column 22c is secured, as by weld metal w, to back-end, corner portions of 13 that define an upright, box-shaped pocket 13a (see Figures 3 and 6).

As illustrated in Figure 6, telescopic parts or members 22a to 22c, inclusive, have rolled-in vertical grooves or complementary offset portions 22f along one side to keep them from turning, but to permit their vertical slide movement with respect to each other. The position relationship between the column parts 22a and 22b is provided by a thumb screw 23a that is threadably mounted for adjustment in the intermediate part 22b to abut or clamp upon the inner part 22a. In a like manner, a thumb screw 23b is threadably mounted for adjustment in the outer part 22c to extend through wall 13 and to abut or clamp against the intermediate column part 22b. In this manner, the column parts 22a to 22c are secured in any desired adjusted or telescopic relationship with each other. As shown particularly in Figure 1, I have provided notches 22e in the side walls 13 to receive thumb screws 23a when the lid 16 has been moved all the way down or to a closed position on the walls 13. It is thus apparent that I have provided a disappearing or vanishing column assembly for the back or tail end of the trailer unit, in the sense that the column members or assemblies 22 are adapted to slide substantially completely within or to collapse within end portions of the side walls 13.

As shown in Figure 1, I may provide an inwardly-projecting rim member 24 for supporting a double bed mattress 25 (see Figure 2) above the top of compartments A and B. That is, the top 26 of the compartment B cooperates with member 24 to support a spring or mattress assembly. For carrying and storing suitable articles, I have shown the back portion of compartment B provided with shelves and doors, see particularly Figures 1 and 2. Swing door 27 provides a sub-compartment a, swing door 28 provides sub-compartment b, and drawers 29 provide a compartment c. Cooking utensils, food, dishes, cutlery, etc., may be stored in these compartments as desired.

Referring particularly to Figure 2 of the drawings, I have shown how my trailer unit 10 may be employed with a tent unit, such as 32. In this connection, the back half of the top or lid 16 serves as a water-proof roof or back-extension cover for the tent, as well as a suspension support for its members. By way of illustration, I have shown the tent construction 32 as having a pair of back halves 32a that may be secured together by a separating type of slide fastener 33, and that have right and left side portions 32c and triangular-shaped closing-off or fill-in pieces or portions 32d. The tent 32 also is shown provided with a canvas floor 34 and as containing a foldable camp chair 41, a foldable table 40, and a foldable cot 42.

The tent 32 may be secured to the ground by pegs, as indicated, and is secured to the under-side of the back portion 18a and side portions 18b of the roof rim, as by snaps or eyelets, such as illustrated, by the snaps 38 that are mounted on the tail gate 15 for securing the floor portion 34 in position thereon.

The steps of assembling and collapsing the trailer unit 10 of my construction are illustrated in Figures 7 to 11, inclusive. In Figures 7 to 12, the unit is fully collapsed and locked and in a ready-to-travel condition. In Figure 8, the hasps 15a have been unlocked and the top 16 is being raised by tilting it up from its front end and about its back end on columns 20 to preliminarily expand hood 31. In Figure 9, this operation is continued with the column assembly pair 22 still in a down or collapsed position, with the support rods 20 in their fully upright or vertical positions, and with the hood 31 and its frame 30 in a fully expanded and open position. In Figure 10, the operation of raising the back portion of the lid 16 by the column assemblies 22 is being effected. In Figure 11, the tent portions have been added and installed. An entrance flap is shown in one of the side portions 32c.

As shown in Figure 2, the hood 31 has side curtain portions provided with a screen window 31b; these curtain portions may also be secured in position by conventional eyelets or snaps. The side and end portions of the tent 32 (see Figure 2) project or hang downwardly from the underside of the roof 16, since they are removably mounted (as by snaps, such as 38) to extend from columns 22 along side portions 18b and along end portion 18a. The mounting of the tent 10 is thus from the backwardly-projecting half or portions of the roof 16. It is easy, when it is desired to collapse the assembly, to unhook or unsnap the upper end of the tent 32, drop it upon the floor 34, then fold the whole up on the floor (see Figure 10), and mount it on the rack or frame 15c of the swing door or tail gate 15.

What I claim is:

1. A trailer of a collapsible type which comprises, a floor member having a substantially box-like body, an enclosing roof member having side portions to fit upon side walls of and seal off said body when the trailer is in a collapsed position, a vertically-swingable arm construction pivotally mounted on said body and connected to a front end portion of said roof member to swing said roof member from a lowered position on said body to an upwardly-raised and endwise-projecting relation with respect to said body, a pair of columns, means pivotally-slidably connecting upper end portions of said columns to a back end portion of said roof member, and means slidably carried by and for vertical movement into and out of a back end portion of said body and adjustably connecting lower end portions of said columns to a back end portion of said body to adjust the vertical position of the back end portion of said roof member and securely support said roof member in its raised and backwardly-projecting position.

2. In a trailer as defined in claim 1 wherein, an expandible and collapsible hood is operatively connected between said roof member and front portions of said floor member, and means is operatively mounted to project upwardly from said floor member to hold said hood in its expanded relationship.

3. A trailer as defined in claim 1 wherein, said floor member has a centrally-upwardly-offset portion, a wheel assembly is mounted in said offset portion to provide for movement of the trailer, storage compartments are defined forwardly and rearwardly of said offset portion, and doors are mounted on said side walls to provide access to the storage compartments.

4. A trailer as defined in claim 1 wherein, an expandible and collapsible hood is operatively connected between said body and the front end portion of said roof member, and means cooperates with said hood to collapse it when said roof member is lowered on the side walls of said body and to expand it to aid in positioning said roof member when said roof member is in its endwise-projecting upwardly-raised position.

5. A trailer as defined in claim 1 wherein, a swing door is secured to a back end of said floor member and cooperates with the side walls of said body to define a back end wall for said body, and means is positioned on a back portion of said swing door to carry folded tenting material.

6. A trailer as defined in claim 1 wherein, a wheel unit is mounted substantially in a mid position with respect to said floor member, said floor member and said body define storage compartments forwardly and backwardly of said wheel unit; and a top closure member, doors and drawers are open endwise of the trailer to provide a series of sub-compartments for the back end portion of said frame member.

7. A wheeled trailer of a collapsible type which comprises, a substantially box-like body on a wheeled unit for movement along a roadway, an enclosing roof member having side rim portions to fit downwardly upon upper edges and seal off said body when the trailer is in a collapsed position, a swing construction pivotally mounted on said body and connected to an end portion of said roof member to swing said roof member from a lowered position on said body to an upwardly-raised and endwise-projecting position with respect to said body, a pair of columns pivotally-slidably connected to said back end portions of said roof member and slidably connected to back portions of said body to securely support said roof member in its raised and backwardly-projecting position, each of said pair of columns having at least a pair of slidably-expansible and contractible tubular members, adjustable means mounted on said tubular members to hold them in an adjusted relation with respect to each other, complementary offset portions extending along said tubular members to maintain them in a non-rotating relation with respect to each other, a guide roller operatively carried by an upper tubular member of each of said columns, and a track construction carried by said roof member and having guide slot means to receive and operatively position said guide rollers.

8. A wheeled trailer of a collapsible type which comprises, a substantially box-like body on a wheeled unit for movement along a roadway, an enclosing roof member having side rim portions to fit downwardly upon upper edges and seal off said body when the trailer is in a collapsed position, a swing construction pivotally mounted on said body and connected to an end portion of said roof member to swing said roof member from a lowered position on said body to an upwardly-raised and endwise-projecting position with respect to said body, a pair of columns pivotally-slidably connected to back end portions of said roof member and slidably connected to back portions of said body to securely support said roof member in its raised and backwardly-projecting position, a tent material removably suspended from endwise-projecting portions of said roof member when said roof member is in its upwardly-raised and endwise-projecting position, a tail gate carried on said body, a rack on said tail gate, and said tent material being adapted to be dropped from said roof member, folded up and positioned in said rack when the trailer is to be collapsed.

References Cited in the file of this patent

UNITED STATES PATENTS

| 734,422 | Leppert | July 21, 1903 |
| 1,474,283 | Nystrom et al. | Nov. 13, 1923 |
| 2,225,993 | Hornberger | Dec. 24, 1940 |
| 2,459,026 | Hardy | Jan. 11, 1949 |
| 2,551,207 | Ensor | May 1, 1951 |
| 2,714,524 | Swiggum | Aug. 2, 1955 |

FOREIGN PATENTS

| 1,093,992 | France | Dec. 1, 1954 |
| 463,825 | Great Britain | Apr. 7, 1937 |
| 689,969 | Great Britain | Apr. 8, 1953 |